United States Patent Office 3,431,244
Patented Mar. 4, 1969

3,431,244
PRODUCTION OF POLYACRYLONITRILE FIBRES
Graham John Brealey, Finham, Coventry, England, assignor to Courtaulds Limited, London, England, a British company
No Drawing. Filed Jan. 17, 1966, Ser. No. 520,850
Claims priority, application Great Britain, Jan. 18, 1965, 2,125/65
U.S. Cl. 260—78.5  8 Claims
Int. Cl. C08f 1/30, 1/76, 3/76

This invention relates to the production of polyacrylonitrile fibres and in particular to the production of such fibres of improved colour. In this specification the term "polyacrylonitrile" is defined as including both homopolymers of acrylonitrile and copolymers containing at least 80 percent by weight of acrylonitrile units.

In one method of producing polyacrylonitrile the monomer is polymerised in solution in a solvent which comprises a solution of an inorganic salt such as sodium thiocyanate in water. The solution may also contain such other copolymerisable monomers as may be desired. A polymerisation catalyst is also added and polymerisation takes place when the temperature of the solution is raised. When the polymer produced is soluble in the inorganic salt solution used, the solution may be spun into fibres directly into an aqueous coagulating bath which may be, for example, a dilute aqueous solution of the salt employed in the solvent.

The presence of iron in the solution has been found to have an inhibiting effect on the polymerisation and also to give fibres of increased colour. It is not practicable to operate at zero iron concentration since some iron is inevitably picked up from reaction vessels etc., and provision of entirely non-ferrous equipment would be very expensive.

According to the invention the process for the production of polyacrylonitrile fibres of improved colour comprises polymerising acrylonitrile catalytically in an aqueous solution of an inorganic salt at an elevated temperature in the presence of a soluble titanium salt dissolved in the polymerisation solvent, and spinning the resulting solution into fibres.

The invention may be applied to processes for the polymerisation of acrylonitrile alone or to processes for the production of copolymers of acrylonitrile with other monomers, such as styrene, methyl acrylate, methyl methacrylate, vinyl acetate, itaconic acid, acrylic acid, methallyl sulphonic acid and its salts, and mixtures of two or more such other monomers. Such other monomers may be present in amounts up to that required to produce a copolymer having not less than 80 percent by weight of acrylonitrile units. The maximum amount of comonomer to give such final copolymers will approximate to 20 percent, although considerable variation is possible in view of the different polymerisation rates of the two monomers. It is preferred to employ monomers in such proportions that the copolymer formed contained from 90 to 95 percent by weight of acrylonitrile units. The process of the invention is particularly effective when the polymer contains complexing groups.

The titanium salt employed in the process of the invention is required to be soluble in the polymerisation solution, and most titanium salts which are soluble in water meet this requirement. A suitable example is potassium titanium oxalate. The concentration of titanium ions may vary within relatively wide limits, although a concentration within the range from 1 to 15 parts/million by weight based on the weight of the polymerisation solution is preferred. A particularly preferred concentration is within the range of from 1 to 6 parts/million.

The process of the invention may be carried out in the presence of impurities formed during the polymerisation, and in the presence of additives such as reducing agents. Certain of these additives and impurities may in fact improve the results obtained in the presence of titanium.

The monomer or monomers are polymerised in the presence of a polymerisation catalyst which is preferably a free radical forming catalyst of the azo type at an elevated temperature for example, within the range from 0.035 percent to 0.1 percent and the resutling solution is spun into fibres using an aqueous coagulating bath which may contain a dilute solution of the inorganic salt which constitutes the main constituent of the polymerising solvent.

The invention is illustrated by the following Examples in which percentages are by weight unless otherwise indicated. In the examples fibre yellowness values (Y) are expressed as, $$Y = \frac{R-B}{G}$$

where R, B and G are reflectances for red, blue and green light as measured in a colorimeter.

EXAMPLE 1

A polymerisation feed mix was prepared having the following composition:

| | |
|---|---:|
| Azobisisobutyronitrile _____percent__ | 0.0486 |
| Acrylonitrile _____do____ | 18.6 |
| Methyl acrylate _____do____ | 1.2 |
| Itaconic acid _____do____ | 0.246 |
| Thiourea dioxide _____do____ | 0.16 |
| Isopropanol _____do____ | 0.897 |
| Recycled solvent (containing 52 percent of sodium thiocyanate in water and 0.2 p.p.m. of iron) _____do____ | 76 |
| Titanium (as potassium titanium oxalate) _____p.p.m__ | 1 |

Water and sodium hydroxide were added to make the mix up to 100 percent at pH 5.

Polymerisation was accomplished at 80° C. employing a dwell time of 100 minutes.

The conversion was 58 percent and the fibre yellowness of 3 denier bright fibres obtained by spinning the solution into an aqueous 10 percent sodium thiocyanate solution was 0.05.

EXAMPLE 2

A feed mix was prepared having the following compositions:

| | |
|---|---:|
| Azobisisobutyronitrile _____percent__ | 0.0374 |
| Thiourea dioxide _____do____ | 0.135 |
| Itaconic acid _____do____ | 0.204 |
| Acrylonitrile _____do____ | 17.1 |
| Methyl acrylate _____do____ | 1.10 |
| Isopropanol _____do____ | 0.8 |
| Recycled solvent (containing 52 percent of sodium thiocyanate and water) _____do____ | 73 |
| Iron (as ferrous ammonium sulphate) ___p.p.m__ | 0.2 |

Water and sodium hydroxide were added to the mixture to bring the mixture to 100 percent with a pH of 5.

The polymerisation was effected at a temperature of 80° C. with a dwell time of 80 minutes, the conversion being 56 percent. The fibre yellowness of 4½ denier matt fibres produced from the polymer was 0.075.

Replacement of the iron by 3 p.p.m. of titanium (as potassium titanium oxalate) gave a fibre yellowness of 0.050 at 57 percent conversion.

EXAMPLE 3

The composition of a feed mix for a polymerisation was as follows:

| | |
|---|---|
| Azobisisobutyronitrile _____percent__ | 0.094 |
| Thiourea dioxide _____do____ | 0.200 |
| Itaconic acid _____do____ | 0.245 |
| Acrylonitrile _____do____ | 18.6 |
| Methyl acrylate _____do____ | 1.2 |
| Recycled solvent (containing 52 percent of sodium thiocyanate in water) _____do____ | 76.0 |
| Iron _____p.p.m__ | 0.1 |
| Titanium _____p.p.m__ | 4.5 |

Polymerisation was accomplished at 80° C. with a dwell time of 100 minutes, to give a 61 percent conversion. The fibre yellowness was 0.033 for 6 denier bright fibres.

Under the optimum conditions using iron instead of titanium, the lowest fibre yellowness for 6 denier bright fibres achieved has been 0.056.

I claim:

1. The process for the production of polyacrylonitrile fibre of improved color which comprises polymerizing acrylonitrile catalytically in an aqueous solution of an inorganic salt at an elevated temperature in the presence of a soluble titanium salt dissolved in the polymerization solvent and a free-radical forming azo catalyst, and spinning the resulting solution into fibres.

2. The process as claimed in claim 1 in which the acrylonitrile is copolymerised with up to 20 percent by weight of a comonomer.

3. The process as claimed in claim 2 in which the comonomer is styrene, methyl acrylate, methyl methacrylate, vinyl acetate, itaconic acid, acrylic acid, methallyl sulphonic acid or its salts, or a mixture of two or more of these compounds.

4. The process as claimed in claim 2 in which the copolymer produced contains from 90 to 95 percent by weight of acrylonitrile units.

5. The process as claimed in claim 1 in which the titanium salt is potassium titanium oxalate.

6. The process as claimed in claim 1, in which the concentration of titanium ions is in the range from 1 to 15 parts/million by weight.

7. The process as claimed in claim 1 in which the concentration of titanium ions is within the range from 1 to 6 parts/million.

8. The process as claimed in claim 1 in which the polymerisation is carried out in the presence of impurities formed during previous polymerisations.

No References cited.

JOSEPH L. SCHOFER, Primary Examiner.

J. KIGHT III, Assistant Examiner.

U.S. Cl. X.R.

260—79.3, 85.5, 85.7, 86.1, 88.7